United States Patent
Kwak et al.

(10) Patent No.: US 10,139,666 B2
(45) Date of Patent: Nov. 27, 2018

(54) DISPLAY DEVICE ARRAY SUBSTRATE

(71) Applicant: SAMSUNG DISPLAY CO., LTD., Yongin-si, Gyeonggi-do (KR)

(72) Inventors: Chang Hun Kwak, Suwon-si (KR); Dae Youn Park, Cheonan-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/206,052

(22) Filed: Jul. 8, 2016

(65) Prior Publication Data

US 2017/0010504 A1    Jan. 12, 2017

(30) Foreign Application Priority Data

Jul. 10, 2015   (KR) .................. 10-2015-0098530

(51) Int. Cl.
   *G02F 1/1335*   (2006.01)
   *G02F 1/1333*   (2006.01)
   *G02F 1/1362*   (2006.01)

(52) U.S. Cl.
   CPC .. *G02F 1/133514* (2013.01); *G02F 1/133512* (2013.01); *G02F 2001/133388* (2013.01); *G02F 2001/136222* (2013.01)

(58) Field of Classification Search
   CPC .............................. G02F 1/133514
   See application file for complete search history.

(56) References Cited

U.S. PATENT DOCUMENTS

| 8,553,181 | B2 | 10/2013 | Yamakawa et al. |
| 2004/0227873 | A1* | 11/2004 | Peng ............... G02F 1/133512 349/106 |
| 2013/0077008 | A1* | 3/2013 | Kim ............... G02F 1/136227 349/42 |
| 2014/0168584 | A1* | 6/2014 | Lee ............... G02F 1/133512 349/106 |
| 2015/0198842 | A1 | 7/2015 | Kwak et al. |
| 2016/0124263 | A1 | 5/2016 | Park et al. |

FOREIGN PATENT DOCUMENTS

| KR | 10-0945349 B1 | 3/2010 |
| KR | 10-2010-0129027 A | 12/2010 |
| KR | 10-2013-0137457 A | 12/2013 |
| KR | 10-2016-0053195 A | 5/2016 |

* cited by examiner

*Primary Examiner* — James Dudek
(74) *Attorney, Agent, or Firm* — Innovation Counsel LLP

(57) ABSTRACT

A display device array substrate comprising first and second substrates that comprise a display area and a dummy area around the periphery of the display area, and that face each other; a color filter disposed on the first substrate; and a liquid crystal layer disposed on the color filter. The color filter comprises at least one or more first color filters and adjacent second color filters, and the first color filters and the second color filters overlap each other in the display area and do not overlap each other in the dummy area.

7 Claims, 18 Drawing Sheets

DISPLAY DEVICE ARRAY SUBSTRATE

This application claims priority from Korean Patent Application No. 10-2015-0098530 filed on Jul. 10, 2015 in the Korean Intellectual Property Office, the disclosure of which is incorporated herein by reference in its entirety.

BACKGROUND

1. Field of the Invention

Embodiments of the present invention relate generally to flat panel displays. More specifically, embodiments of the present invention relate to display device array substrates.

2. Description of the Related Art

The importance of the display device has increased with the development of multimedia. In response to this, various kinds of displays, such as a liquid crystal display (LCD) and an organic light emitting display (OLED), have been developed.

The liquid crystal display is a device that obtains a desired image signal, by applying an electric field to a liquid crystal material that has an anisotropic dielectric constant and that has been injected between the two substrates. The amount of light transmitted through the substrate from an external light source is thus controlled by adjusting the intensity of the electric field.

In fabrication, the liquid crystal material is injected between the two substrates of the liquid crystal display by applying the material onto the display substrate in a liquid state. However, when the spread of the liquid crystal is not uniform, display defects in which a specific pattern is observed in a display area may occur, which may reduce the display quality of the display device. Thus, there is a need for a scheme capable of preventing this problem.

SUMMARY

Aspects of the present invention provide a display device array substrate in which the liquid crystal within the display area can be more uniformly applied.

However, aspects of the present invention are not restricted to the ones set forth herein. The above and other aspects of the present invention will become more apparent to one of ordinary skill in the art to which the present embodiments pertain by referencing the detailed description given below.

According to an exemplary embodiment of the invention, there is provided a display device array substrate comprising first and second substrates that comprise a display area and a dummy area around the periphery of the display area, and that face each other; a color filter disposed on the first substrate; and a liquid crystal layer disposed on the color filter. The color filter comprises at least one or more first color filters and adjacent second color filters, and the first color filters and the second color filters overlap each other in the display area and do not overlap each other in the dummy area.

The display device array substrate may further comprise a dummy color filter that comprises a same material as one of the first color filters and the second color filters and is formed in the dummy area, wherein the dummy color filter extends around the display area.

The dummy color filter may be a red or blue color filter.

The dummy color filter may extend from one of the first color filter and the second color filter.

One of the first color filter and the second color filter may not overlap the dummy color filter.

One of the first color filter and the second color filter may be spaced apart from the dummy color filter.

A gap between one of the first color filter and the second color filter and the dummy color filter may be from 0 µm to 5 µm.

The display device array substrate may further comprise a black matrix disposed on at least a part of the dummy color filter and the color filter, wherein the black matrix extends around a periphery of the display area in the dummy area.

The thickness of the black matrix over a gap between the dummy color filter and one of the first color filter and the second color filter may be equal to or smaller than the thickness of the black matrix on the dummy color filter.

The first color filter and the second color filter may overlap each other in the display area and are spaced apart from each other in the dummy area.

The color filter may further comprise a third color filter, and the third color filter may be a green color filter.

In still another aspect of the present invention, there is provided a display device array substrate, comprising first and second substrates that comprise a display area and a dummy area around the periphery of the display area, and that face each other; a color filter disposed on the first substrate; and a liquid crystal layer disposed on the color filter. The color filter comprises a first color filter and an adjacent second color filter. The combined thickness of the first color filter and the second color filter at an interface between the two in the display area is greater than the combined thickness of the first color filter and the second color filter at an interface between the two in the dummy area.

The display device array substrate may further comprise a dummy color filter comprising a same material as one of the first color filter and the second color filter and being formed in the dummy area, wherein the dummy color filter extends around the display area.

The dummy color filter may be a red or blue color filter.

The dummy color filter may extend from one of the first color filter and the second color filter.

The dummy color filter may be spaced apart from one of the first color filter and the second color filter.

The other of the first color filter and the second color filter may be connected to the dummy color filter.

A gap between one of the first color filter and the second color filter and the dummy color filter may be from 0 µm to 5 µm.

According to embodiments of the present invention, it is possible to provide a display device in which the liquid crystal is more uniformly applied and in which display defects can be prevented.

The effects according to the embodiments of the present invention are not limited by the contents described above as an example, and further various effects are included herein.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
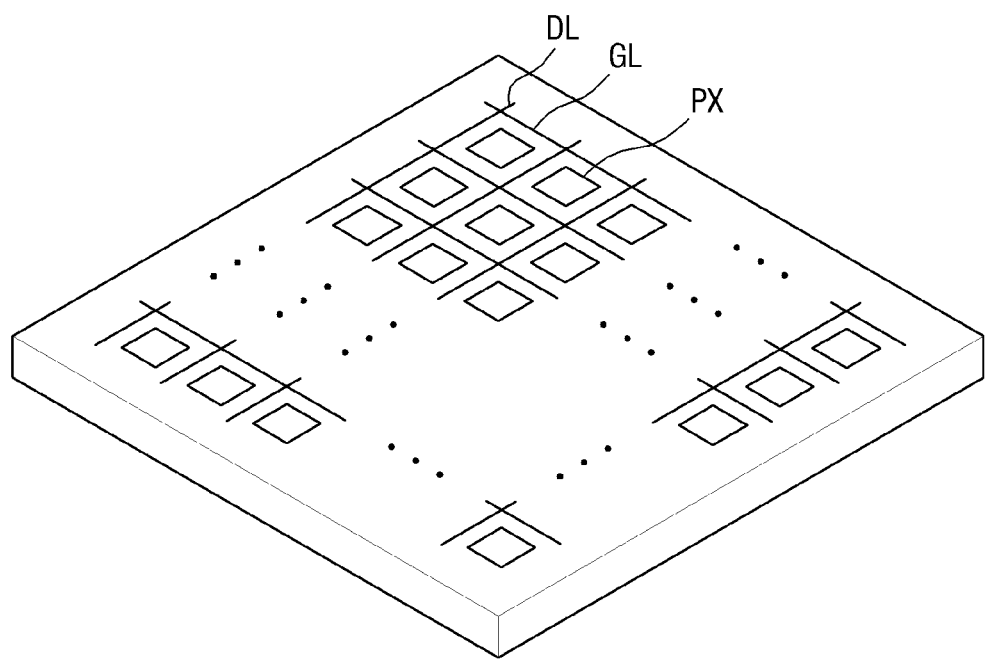
FIG. 1 is a perspective view of a display device array substrate according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same reference numerals are used for the same elements across various figures. In the drawings, sizes and relative sizes of layers and areas may be exaggerated for clarity in explanation. The various Figures are thus not necessarily to scale.

The term "on" that is used to designate that an element is on another element located on a different layer or a layer includes both a case where an element is located directly on another element or a layer and a case where an element is located on another element via another layer or still another element.

Although the terms "first, second, and so forth" are used to describe diverse constituent elements, such constituent elements are not limited by the terms. The terms are used only to discriminate a constituent element from another constituent element. Accordingly, in the following description, a first constituent element may be a second constituent element.

All numerical values are approximate, and may vary. All examples of specific materials and compositions are to be taken as nonlimiting and exemplary only. Other suitable materials and compositions may be used instead.

Hereinafter, embodiments of the present invention will be described with reference to the accompanying drawings.

FIG. 1 illustrates a schematic perspective view of a display device array substrate according to an embodiment of the present invention.

Referring to FIG. 1, a display device array substrate 1000 according to an embodiment of the present invention may include a plurality of data lines DL, a plurality of gate lines GL and a plurality of pixels PX.

The plurality of gate lines GL may be disposed in rows to be spaced apart at regular intervals from each other, and may transmit the gate signals. The plurality of data lines DL may be disposed in columns and spaced apart at regular intervals from each other, and may transmit the data signals. The plurality of gate lines GL and the plurality of data lines DL may be disposed in a matrix form, and the pixels PX may be disposed at the intersections of the gate lines GL and data lines DL. The gate signals and the data signals may be generated by an external source and provided to the gate lines GL and data lines DL. These signals may have several different levels of voltage values.

Meanwhile, in order to embody the color display, each pixel PX may display one color of the primary or basic colors, and examples of these basic colors may include red, green and blue. The pixel PX which displays red may be called a red pixel, the pixel PX which displays green may be called a green pixel, and the pixel PX which displays blue may be called a blue pixel. Three pixels PX collectively having each primary color may be referred to as an upper pixel (not illustrated). Further, the red pixel, the green pixel and the blue pixel may be alternately disposed in a row direction or a column direction, or the three pixels may be disposed at positions corresponding to the three vertices of a triangle. The pixels may be disposed in various ways, and are not limited to the arrangement of the pixels as described above.

Figure 2:
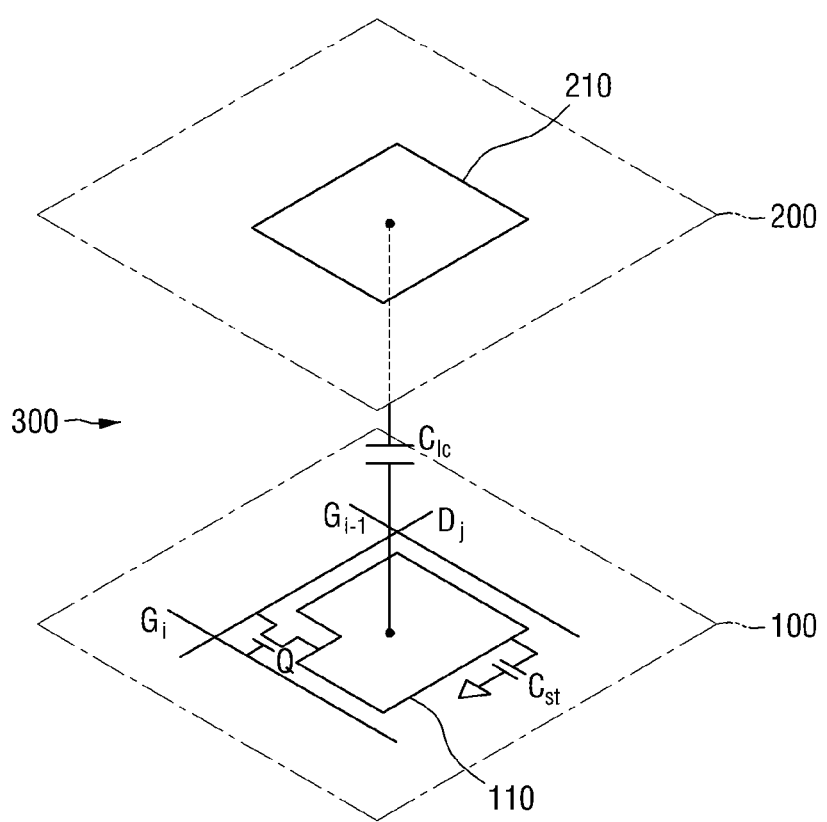
FIG. 2 is a schematic view illustrating a structure of a pixel according to an embodiment of the present invention.

FIG. 2 is a schematic view illustrating a structure of a pixel according to an embodiment of the present invention.

Referring to FIG. 2, the pixel PX may include a first substrate 100, a second substrate 200 and a liquid crystal layer 300 filling the gap therebetween. Further, the pixel may include a switching element Q connected to the gate line GL and the data line DL, and the switching element Q may be connected to the pixel electrode 110.

The pixel electrode 110 may interact with the common electrode 210 disposed on the second substrate 200 to form a liquid crystal capacitor Clc, and the pixel electrode 110 may include, or form part of, a storage capacitor Cst. However, the storage capacitor Cst may be omitted if desired.

The switching element Q is a three-terminal element formed of a thin film transistor provided in or on the first substrate 100. The control terminal of the switching element Q may be connected to a gate line Gi, the input terminal may be connected to a data line Dj, and the output terminal may be connected to the liquid crystal capacitor Clc and the storage capacitor Cst.

The liquid crystal capacitor Clc has the pixel electrode 110 of the first substrate 100 and the common electrode 210 of the second substrate 200 as its two terminals, and a liquid crystal layer 300 between the pixel electrode 110 and the common electrode 210 as its dielectric. The pixel electrode 110 may be connected to the switching element Q, and the common electrode 210 is formed on the front surface of the second substrate 200 and may be provided with a common voltage Vcom.

The storage condenser Cst playing an auxiliary role to the liquid crystal capacitor Clc may be formed by superposition of a separate signal line (not illustrated) provided on the first substrate 100 and the pixel electrode 110 with an insulator therebetween, and a defined voltage such as the common voltage Vcom may be provided to the separate signal line (not illustrated). Alternatively, the storage capacitor Cst may be formed by, for example, superposition of the pixel electrode 110 with a front end gate line Gi-1 directly above the pixel electrode with an intervening insulator.

Meanwhile, referring to FIG. 1, each pixel PX may display one of the primary colors to embody the color display as described above, and in order to embody the color display, a color filter (not illustrated) may be provided on the first substrate 100. This will be described in further detail with reference to FIG. 3.

Figure 3:
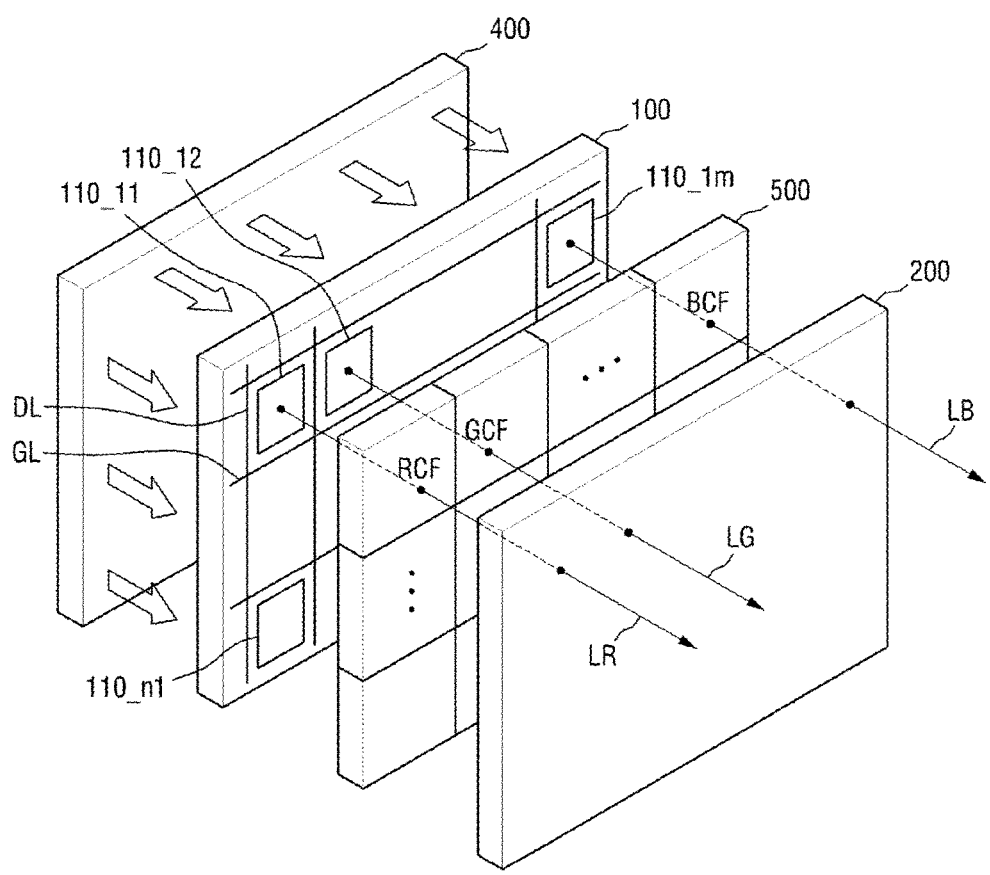
FIG. 3 is an exploded perspective view of a display device array substrate and a backlight unit according to an embodiment of the present invention.

FIG. 3 illustrates an exploded perspective view of a display device array substrate and a backlight unit according to an embodiment of the present invention.

Referring to FIG. 3, a display device array substrate may be configured so that a color filter 500 is disposed between the second substrate 200 and the first substrate 100. Also, the display device including the display device array substrate may be configured so that a backlight unit 400 is disposed on the back of the display device array substrate.

The backlight unit 400 may emit white light having components of different wavelengths. The structure and shape of the backlight unit 400 are not limited to those illustrated in FIG. 3, and any type of light source capable of forming the backlight unit 400 may be employed, such as a cold cathode fluorescent lamp and/or a light-emitting diode. Since these types of light sources and the structure of the backlight unit are widely known in the art, detailed description will not be provided.

The color filter 500 may include a plurality of color filters (RCF, GCF, BCF) and may allow each pixel PX to display a particular color, by selectively passing only light of a specific wavelength band.

Adjacent color filters (RCF, GCF, BCF) may each be of a different color, although the color filters may have various other arrangements and shapes, without being limited to the shape of the matrix illustrated in FIG. 3.

The respective color filters (RCF, GCF, BCF) forming the color filter 500 are disposed to correspond to a direction in which the light emitted from the backlight unit 400 proceeds through the pixel electrode 110, thereby displaying the different colors for each area corresponding to each pixel electrode 110. However, a single color filter may also be formed over an area corresponding to multiple pixels PX, and a plurality of color filters may be formed in an area corresponding to a single pixel PX, without being limited thereto.

Specifically, a first light LR incident from the backlight unit 400 to a first row and first column pixel electrode 110_11 passes through a red color filter RCF disposed to correspond to the first row and first column pixel electrode 110_11, and may thereby be changed to red light. The light then passes through the second substrate 200 and out of the display, where it is recognized as red light by a user.

Next, a second light LG incident from the backlight unit 400 to a first row and second column pixel electrode 110_12 passes through a green color filter GCF disposed to correspond to the first row and second column pixel electrode 110_12, and may thereby be changed to green light. The light then passes through the second substrate 200 and out of the display, where it is recognized as green light by a user.

Next, a third light LB incident from the backlight unit 400 to a first row and mth column pixel electrode 110_1m passes through a blue color filter BCF disposed to correspond to the first row and m column pixel electrode 110_1m, and may thereby be changed to blue light. The light then passes through the second substrate 200 and out of the display, where it is recognized as blue light by a user.

Meanwhile, the respective color filters (RCF, GCF, BCF) are not limited to the rectangular shape illustrated in FIG. 3 and may have various shapes. Further, boundaries among the respective color filters (RCF, GCF, BCF) are not limited to straight lines, and may instead be curved lines. Some of the adjacent color filters may also be formed to overlap each other.

Figure 4:
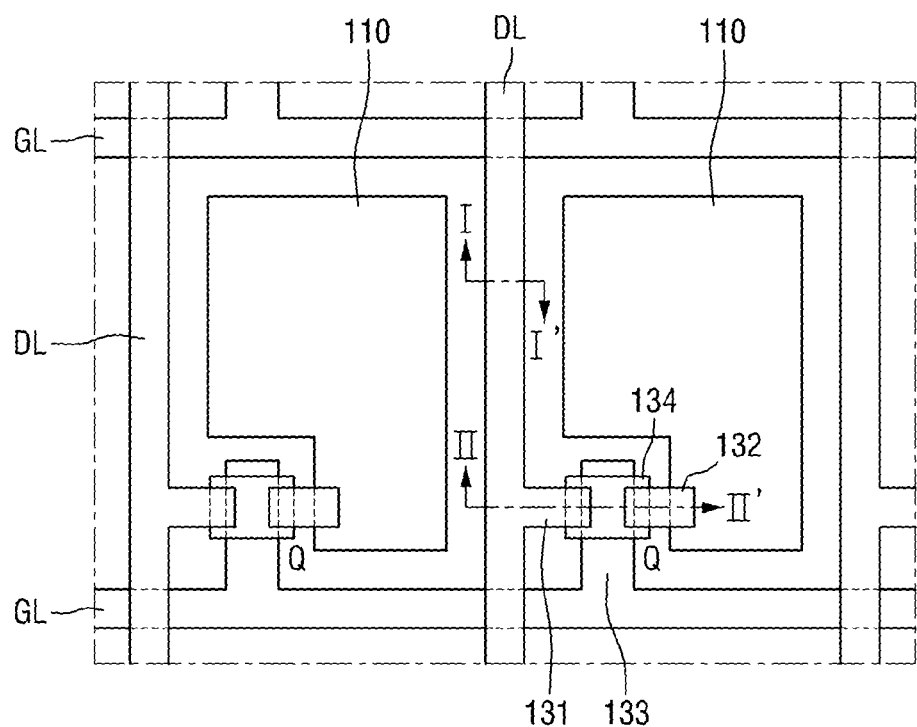
FIG. 4 is a plan view of a portion of a display device array substrate according to an embodiment of the present invention.

FIG. 4 illustrates a plan view of display areas of the display device array substrate according to an embodiment of the present invention.

Referring to FIG. 4, the display device array substrate may include a plurality of data lines DL disposed on the first substrate 100 to extend in a first direction, a plurality of gate lines GL disposed on the first substrate 100 to extend in a second direction, switching elements Q electrically connected to the data lines DL and the gate lines GL, and pixel electrodes 110 connected to the switching elements Q.

Also, the first substrate 100 may be made of a transparent insulating material, the data lines DL may include a plurality of data electrodes 131, and the gate lines GL may include a plurality of gate electrodes 133. Each switching element Q may be formed as a thin film transistor, specifically, the data electrode 131 corresponds to the source terminal, the gate electrode 133 corresponds to the control terminal, and the drain electrode 132 connected to the pixel electrode 110 corresponds to the drain terminal. The switching element may be formed to include a semiconductor layer 134 that can electrically connect the data electrode 131 and the drain electrode 132, depending on the voltage provided to the gate electrode 133.

The color filter 500, the common electrode 210 and the second substrate 200 may be disposed on top of the data line DL, the gate line GL, the switching element Q and the pixel electrode 110 illustrated in FIG. 4. This will be described in more detail with reference to FIG. 5.

Figure 5:
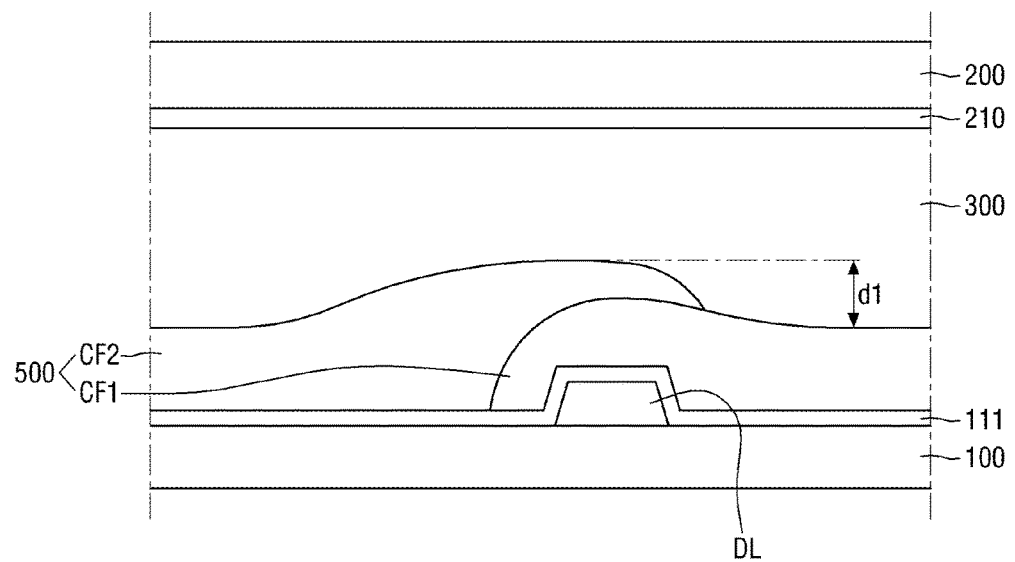
FIG. 5 is a cross-sectional view taken along the line I-I' of the display device array substrate of FIG. 4.

FIG. 5 illustrates a cross-sectional view taken along the line I-I' of the display device array substrate of FIG. 4.

Referring to FIG. 5, the data line DL may be formed on the first substrate 100. An insulating film 111 may be formed on the data line DL and on the parts of the first substrate 100 on which the data line DL is not disposed. The insulating film 111 may be a silicon oxide film, a silicon nitride film or a multilayer of these films, and may be formed using other constituents without being limited thereto.

A color filter 500 including a plurality of color filters (CF1, CF2) may be formed on the insulating film 110, the light having the different wavelength area bands may pass through each of the plurality of color filters (CF1, CF2), and the light passing through each color filter may have particular colors as described above.

A liquid crystal layer 300 may be formed on the color filter 500. The liquid crystal layer 300 may include a plurality of liquid crystal molecules, and the alignment of the liquid crystal molecules may be controlled by an electric field formed through the liquid crystal layer 300. Also, the quantity of light passing through the liquid crystal layer 300 may be controlled by the alignment of liquid crystal molecules, and the color to be displayed may be displayed by the interaction of the color filter 500 and the liquid crystal layer 300.

The common electrode 210 may be formed on the second substrate 200 to be placed over the liquid crystal layer 300. The common electrode 210 may interact with the pixel electrode 110 to form a liquid crystal capacitor Clc as described above, and thus, the liquid crystal molecules may be controlled.

The second substrate 200 may be formed of a transparent material through which light can pass.

Meanwhile, the color filter 500 may include a first color filter CF1 and a second color filter CF2. The first color filter CF1 may be disposed on one side of the data line DL, and the second color filter CF2 may be disposed on the other side of the data line DL. Specifically, in FIG. 5, the first color filter CF1 may be disposed on the right side of the data line DL, and the second color filter CF2 may be disposed on the left side of the data line DL. Also, the first color filter CF1 may be disposed to extend from one side to the other side of the data line DL so as to overlap the data line DL.

The first color filter CF1 and the second color filter CF2 may overlap each other on the data line DL. In this way, since the first color filter CF1 and the second color filter CF2 overlap each other, a height of the color filter on the data line DL may be greater than the heights at other areas. That is, there may be a thickness difference d1 between the upper surface of the color filters over the data line DL, and the upper surface of the color filters elsewhere.

Figure 6:
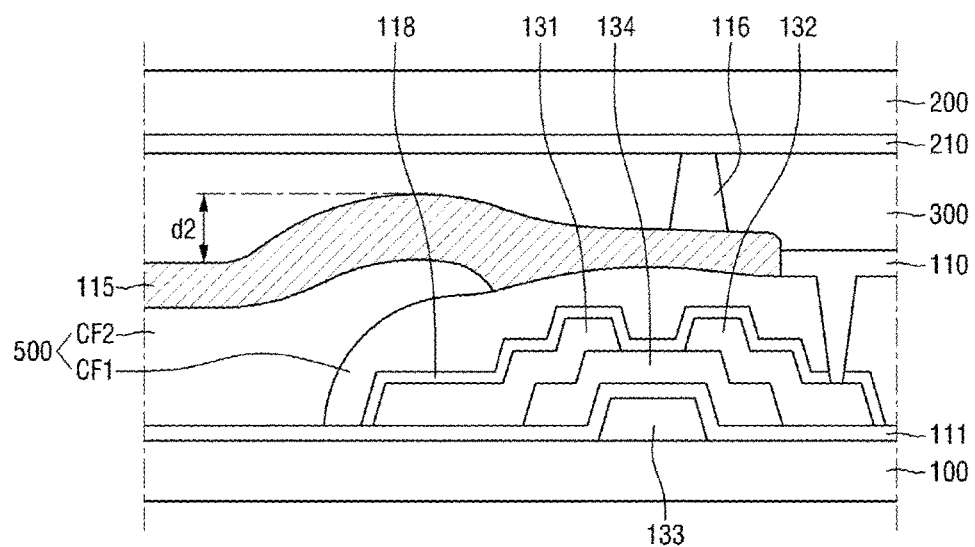
FIG. 6 is a cross-sectional view taken along the line II-II' of the display device array substrate of FIG. 4.

FIG. 6 illustrates a cross-sectional view taken from the line II-IF of the display device array substrate of FIG. 4.

Referring to FIG. 6, the switching element may be formed on the first substrate 100. FIG. 6 illustrates an example in which a thin film transistor is formed as the switching element.

Specifically, the gate line GL may be formed on the first substrate 100. The insulating film 111 may be formed on the gate line GL, and as described above, the insulating film 111 may be formed of a silicon oxide film, a silicon nitride film or a multilayer thereof and may be formed using other constituents without being limited thereto.

A semiconductor layer 134 may be formed on the insulating film 111, and semiconductor layer 134 may allow current to pass or may block the current, depending on the voltage provided to the gate line GL.

The data electrode 131 and the drain electrode 132 may be formed on the semiconductor layer 134. The data electrode 131 may be formed to extend from the data line DL and may provide a data signal supplied to the data line DL to the semiconductor layer 134. An ohmic contact layer (not illustrated) for smooth transmission of the data signal may be formed between the data electrode 131 and the semiconductor layer 134. The drain electrode 132 is connected to the semiconductor layer 134 on the one side and is connected to the pixel electrode 110 on the other side, to provide the data signal passing through the semiconductor layer 134 to the pixel electrode 110. Similar to the data electrode 131, an ohmic contact layer (not illustrated) for smooth transmission of the data signal may be formed between the drain electrode 132 and the semiconductor layer 134.

Further, a second insulating film 118 may be formed on the data line DL, the data electrode 131, the semiconductor layer 134 and the drain electrode 132. The second insulating film 118 may be formed of a silicon oxide film, a silicon nitride film or a multilayer thereof, and may also be formed using other constituents, without being limited thereto. Also, the second insulating film 118 may be omitted if necessary.

A color filter 500 including a plurality of color filters (CF1, Cf2) may be formed on the switching element, and the first color filter CF1 and the second color filter CF2 may allow light having different wavelength area bands to pass. Thus, light passing through the respective color filters (CF1, CF2) may have particular colors as described above. Meanwhile, the display area periphery of the first color filter CF1 and the second color filter CF2 and their arrangement on the dummy area will be described below in further detail.

A black matrix 115 may be formed on the color filter 500. The black matrix 115 may block light. When a user looks at the display device array substrate 1000 from its top, the black matrix 115 helps to prevent the reflection of light due to various wires that form the display device array substrate 1000 and thus to prevent the wires from being visually recognized. The black matrix 115 may be disposed to overlap the various wires on the display device array substrate 1000.

A column spacer 116 may be formed on the black matrix 115. The column spacer 116 may support the second substrate 200. Also, the column spacer 116 may be formed of the same material as the black matrix 115. That is, the column spacer 116 and the black matrix 115 may be simultaneously formed from the same material, using for example a two-tone mask. In this case, the column spacer 116 may be formed in a shape including a protruding portion that partially protrudes from the black matrix 115. However, it is not limited to this, and it is possible to form the black matrix 115 and the column spacer 116 in other ways.

A liquid crystal layer 300 may be formed on the black matrix 115. As described above, the liquid crystal layer 300 may include a plurality of liquid crystal molecules, and the alignment of the liquid crystal molecules may be controlled by an electric field formed through the liquid crystal layer 300. Also, the quantity of light passing through the liquid crystal layer 300 may be controlled by the alignment of the liquid crystal molecules, and the color to be displayed may be the result of the interaction of the color filters (CF1, CF2) and the liquid crystal layer 300.

The common electrode 210 may be positioned on the liquid crystal layer 300. As described above, the common electrode 210 may interact with the pixel electrode 110 to form a liquid crystal capacitor Clc, and thus, the liquid crystal molecules may be controlled.

The second substrate 200 may be formed on the common electrode 210 and may be formed of a transparent material through which light can pass.

Figure 7:
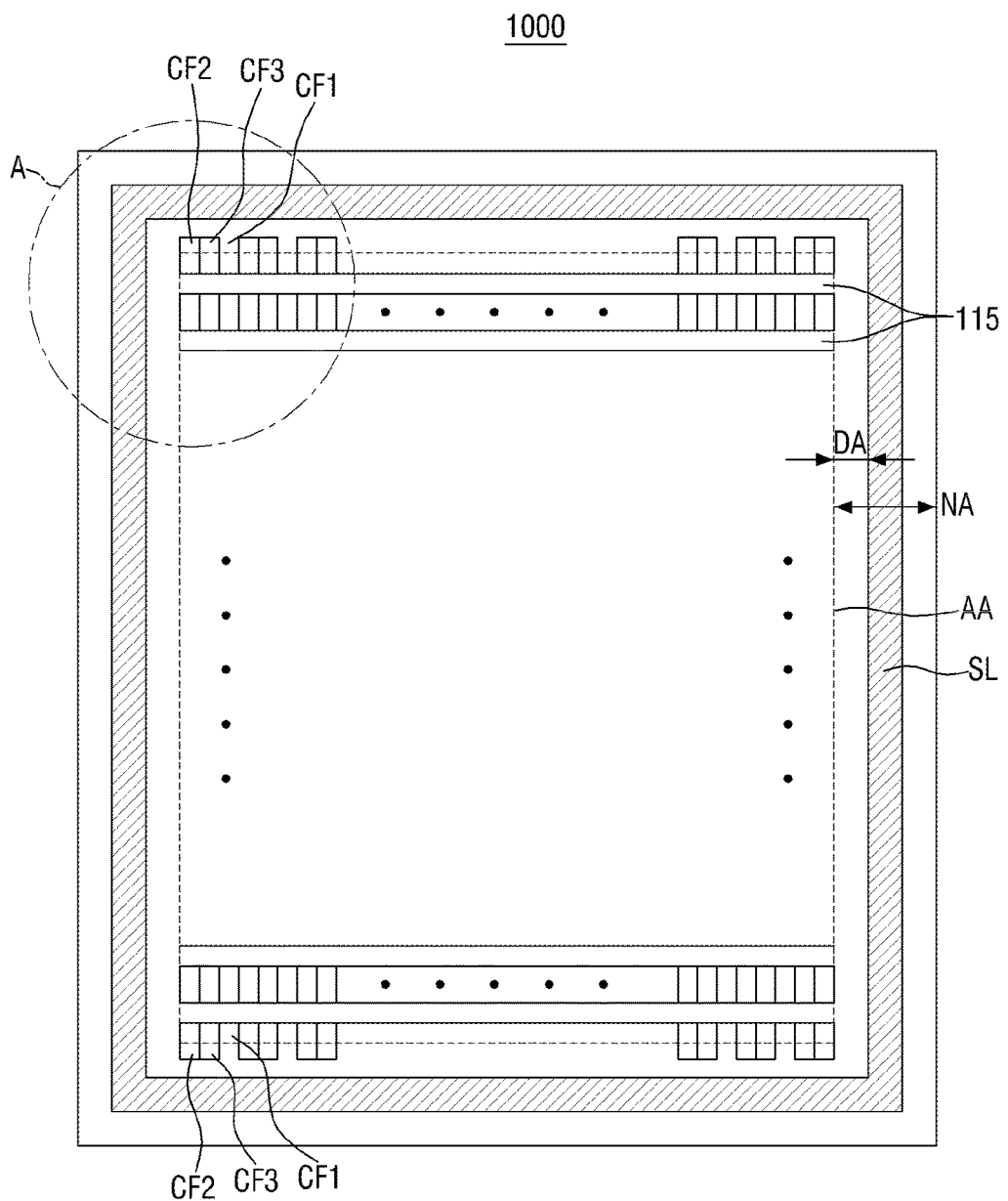
FIG. 7 is a plan view of a display device array substrate according to an embodiment of the present invention.
Figure 8:
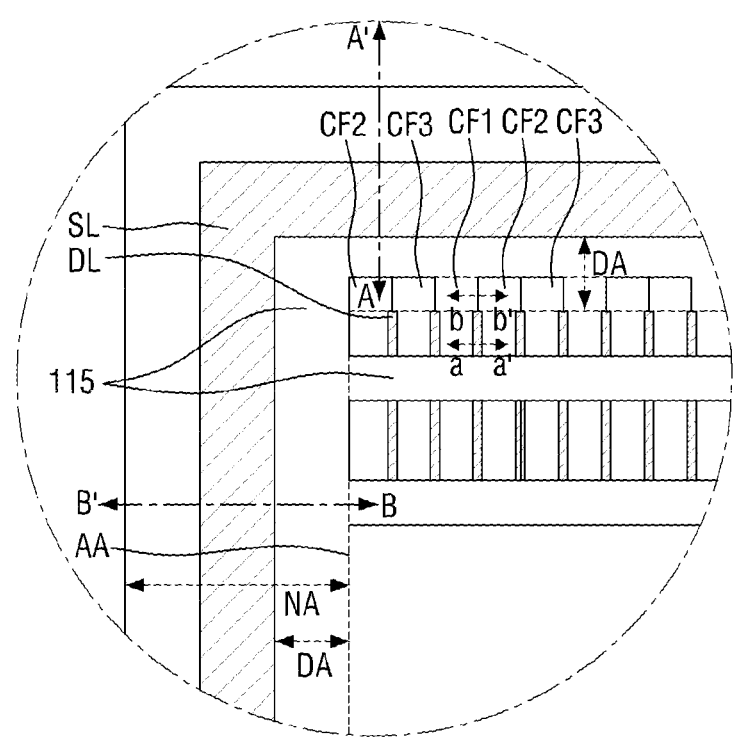
FIG. 8 is an enlarged plan view of a portion A of the display device array substrate of FIG. 7.

FIG. 7 illustrates a plan view of a display device array substrate according to an embodiment of the present invention, and FIG. 8 illustrates an enlarged plan view of a portion A in FIG. 7.

Referring to FIGS. 7 and 8, a display device array substrate may include a display area AA and a non-display area NA that surrounds the periphery of display area AA. Also, a dummy area DA, which surrounds the display area AA, may be included in the non-display area NA.

A sealing agent SL which bonds and seals a first substrate (not illustrated) and a second substrate (not illustrated) may be formed in the non-display area NA, and the sealing agent SL may be formed along the periphery of the first and second substrates to seal the internal elements that form the display device array substrate.

Meanwhile, in this specification, for convenience of explanation, the dummy area DA will be defined on the inside of, i.e. within, the sealing agent SL in the non-display area NA.

The color filter may include a first color filter CF1 and a second color filter CF2 formed on the display area AA, and may further include a third color filter CF3. The first color filter CF1 to the third color filter CF3 may be repeatedly and sequentially arranged, but the arrangement order may be modified in various ways by a person skilled in the art. Each of the color filters (CF1, CF2, CF3) may be a red, green or blue color filter.

Meanwhile, the color filters (CF1, CF2, CF3) are disposed in the display area AA, and some of them may also be disposed in the dummy area DA. As illustrated in FIGS. 7 and 8, in the case of the color filters (CF1, CF2, CF3) located at the boundary between the display area AA and the dummy area DA, the color filters may be formed at the boundary. For example, a part of each such color filter may be located in the display area and the other part may be located in the dummy area DA. However, embodiments of the invention are not limited thereto, and the color filters may instead each be formed wholly within the display area or the dummy area.

Meanwhile, a dummy color filter DCF formed on the dummy area DA may be included, and the dummy color filter DCF may be formed of the same material as one of the first color filter CF1 and the second color filter CF2. The dummy color filter DCF may be formed to wrap around the display area AA.

Referring to FIGS. 7 and 8, the dummy color filter DCF may be formed as an integral extension of the first color filter CF1. Thus, the dummy color filter DCF may be formed of the same material as the first color filter CF1. However, it is not limited thereto, the dummy color filter DCF may be an extension of the second color filter CF2 to have same material thereas.

Meanwhile, as an example, the first color filter CF1 and the second color filter CF2 may be a blue color filter or a red color filter. Thus, the dummy color filter DCF may be formed of the same material as the red or blue color filter.

Figure 9:
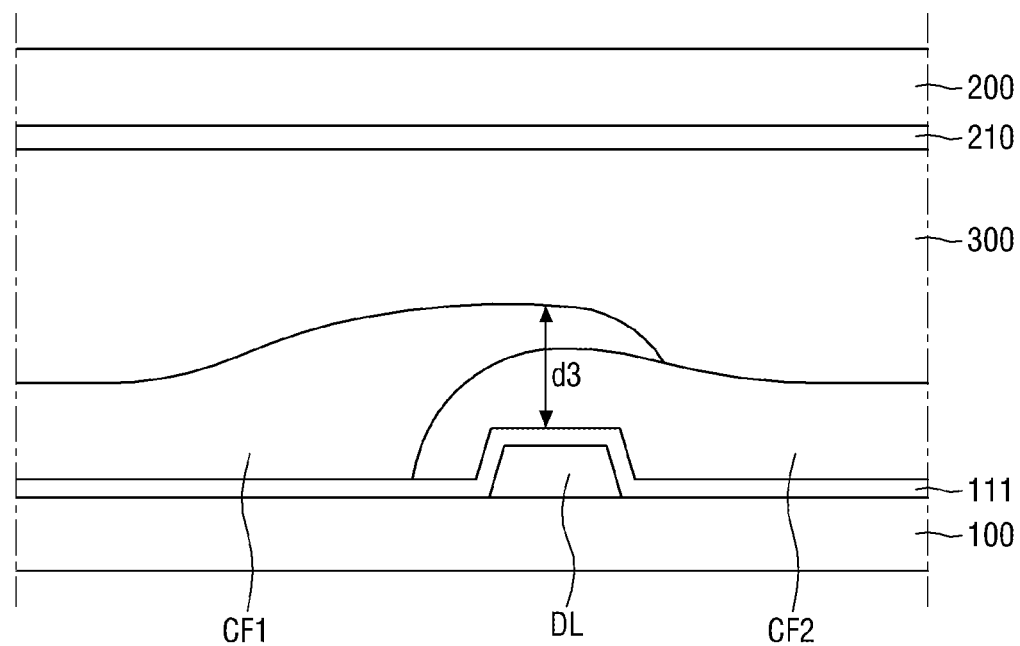
FIG. 9 is a cross-sectional view taken along the line a-a' of the display device array substrate of FIG. 8.
Figure 10:
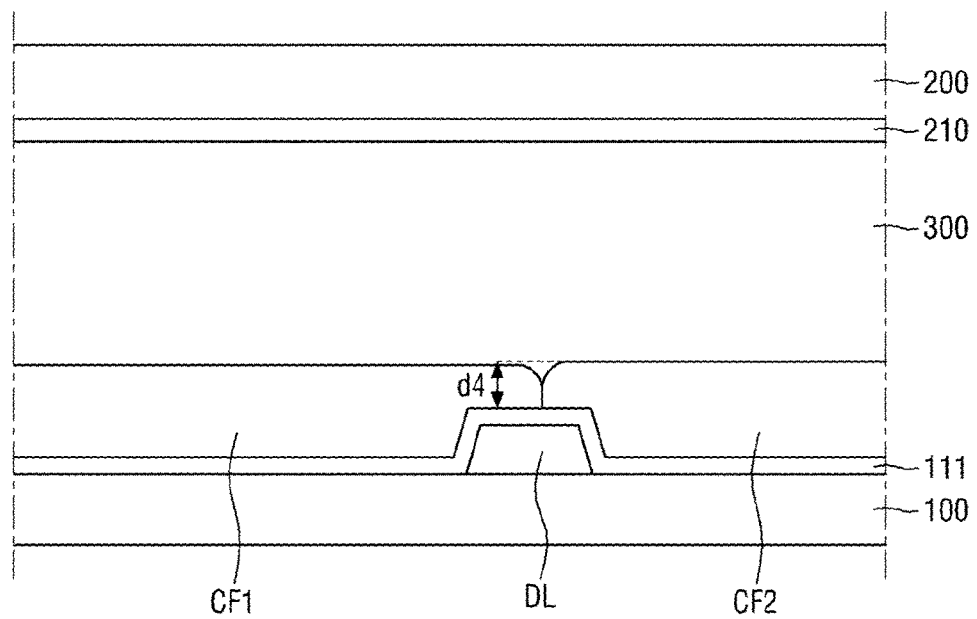
FIG. 10 is a cross-sectional view taken along the line b-b' of the display device array substrate of FIG. 8.

Meanwhile, FIG. 9 illustrates a cross-sectional view taken along the line a-a' on the display area AA of the display device array substrate in FIG. 8, and FIG. 10 illustrates a cross-sectional view taken along the line b-b'.

The display device array substrate of the present invention will be described below in more detail with reference to FIGS. 9 and 10.

The liquid crystal layer 300 is disposed between the first substrate 100 and the second substrate 200, and the first color filter CF1 and the second color filter CF2 may be disposed to overlap each other on the first substrate 100 as above. That is, the first color filter CF1 may come into direct contact with the top of the insulating layer 111 on the first substrate 100. That is to say, the color filters (CF1, CF2) may be located between the liquid crystal layer 300 and the first substrate 100.

The first color filter CF1 and the second color filter CF2 are formed adjacent to each other, and may also be formed to overlap each other. More specifically, the first color filters CF1 and the adjacent second color filters CF2 overlap each other in the display area AA of the display device array substrate, and may not overlap each other in the dummy area DA. That is, in the display area AA illustrated in FIG. 9, the color filters CF1 and CF2 overlap each other over the data line DL. Meanwhile, in the first color filter CF1 and the second color filter CF2 on the dummy area DA illustrated in FIG. 10, it can be seen that they do not overlap each other.

Therefore, a height d3 of the portion in which the color filters abut against each other in the display area AA of FIG. 9 may be greater than a height d4 of the portion in which the color filters abut against each other in the dummy area DA of FIG. 10.

More specifically, the thickness of the boundary between the first color filter CF1 and the second color filter CF2 in the display area AA may be thicker than the thickness of the boundary between the first color filter CF1 and the second color filter CF2 in the dummy area DA. Therefore, the liquid crystal of the display area AA could have a margin and by minimizing a step in the dummy area DA, it is possible to prevent a display defect caused by an imbalanced spread of the liquid crystal in the dummy area DA.

Figure 11:
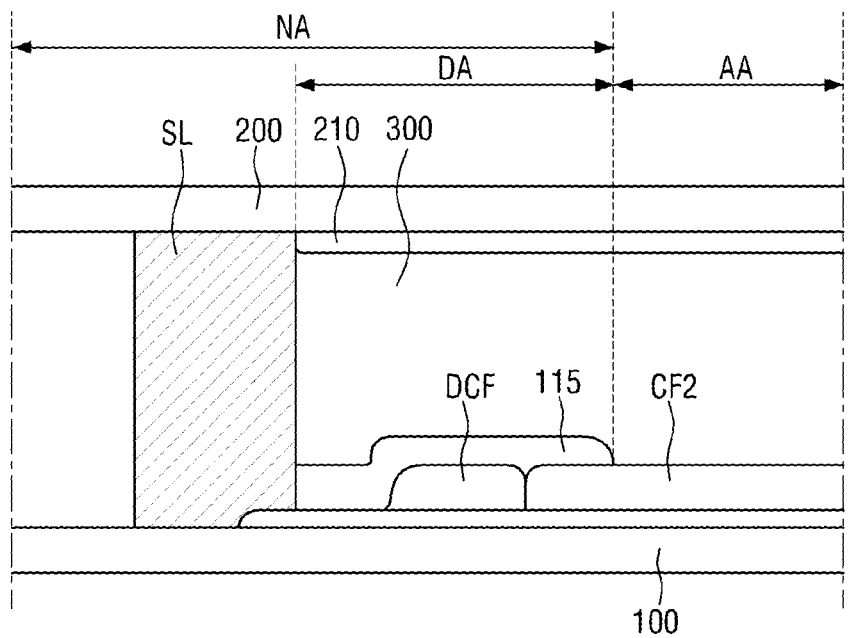
FIG. 11 is a cross-sectional view taken along the line A-A' in the display device array substrate of FIG. 8.

FIG. 11 illustrates a cross-sectional view taken along the line A-A' in the display device array substrate of FIG. 8.

Referring to FIG. 11, a second color filter CF2 is disposed partly in the display area AA and partly in the dummy area DA, and the dummy color filter DCF does not overlap the second color filter CF2. That is, the dummy color filter DCF may be in contact with the second color filter CF2 on some side surfaces, but the dummy color filter DCF does not overlap the second color filter CF2. This prevents a step from rising at the boundary between the dummy color filter DCF and the second color filter CF2 in the dummy area DA, and provides a more uniform liquid crystal distribution in the display area AA.

Figure 12:
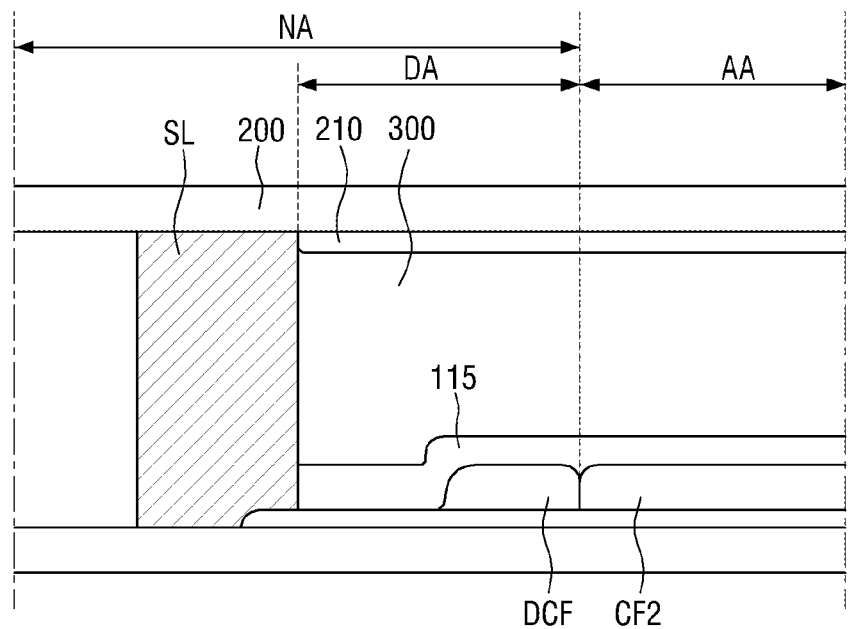
FIG. 12 is a cross-sectional view taken along the line B-B' in the display device array substrate of FIG. 8.

FIG. 12 illustrates a cross-sectional view taken along the line B-B' in the display device array substrate of FIG. 8.

Referring to FIG. 12, a second color filter CF2 may be located only on the inside of the boundary of the display area AA in the display device array substrate. The dummy color filter DCF is formed in the dummy area DA, and the dummy color filter DCF and the second color filter CF2 may be in contact with each other at the boundary between the dummy area DA and the display area AA.

Furthermore, the black matrix 115 extends beyond the display area AA into the dummy area DA, and may also be located on the second color filter CF2. As illustrated in FIG. 8, the black matrix 115 may extend into the display area AA to be located partially on the top of the other color filters.

Figure 13:
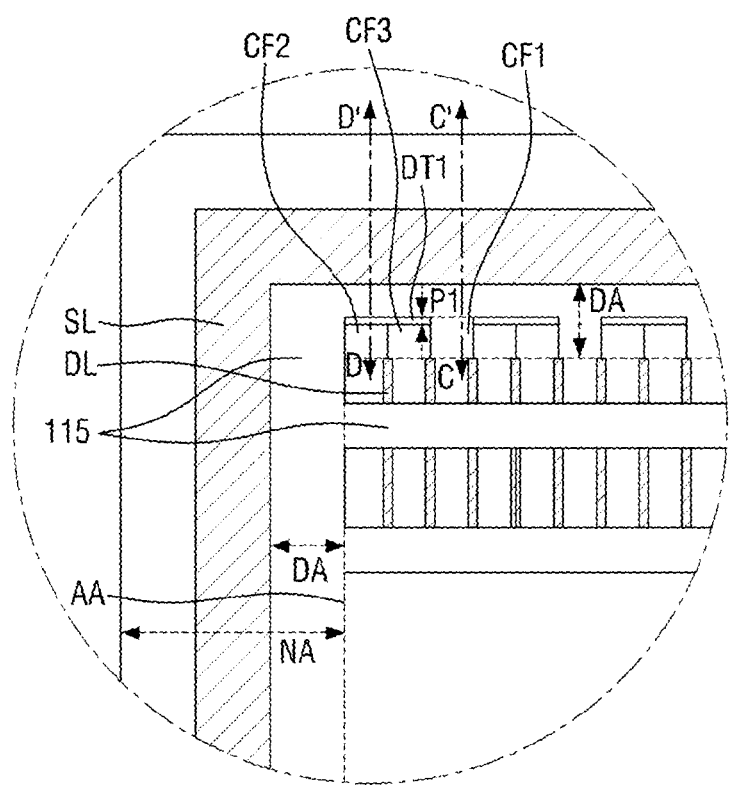
FIG. 13 is an enlarged plan view of a portion A of a display device array substrate according to another embodiment of the present invention.

FIG. 13 illustrates an enlarged plan view of a portion A of a display device array substrate according to another embodiment of the present invention.

Referring to FIG. 13, at least one or more of the first color filter CF1 and the second color filter CF2 may be spaced apart from the dummy color filter DCF in the dummy area DA. Also, a space between one of the first color filter CF1 and the second color filter CF2, and the dummy color filter DCF, may be in the range of 5 μm to 0 μm. The above-mentioned range is feasible, may prevent light leakage in the dummy area DA, and may effectively reduce a step in the dummy area DA.

Figure 14:
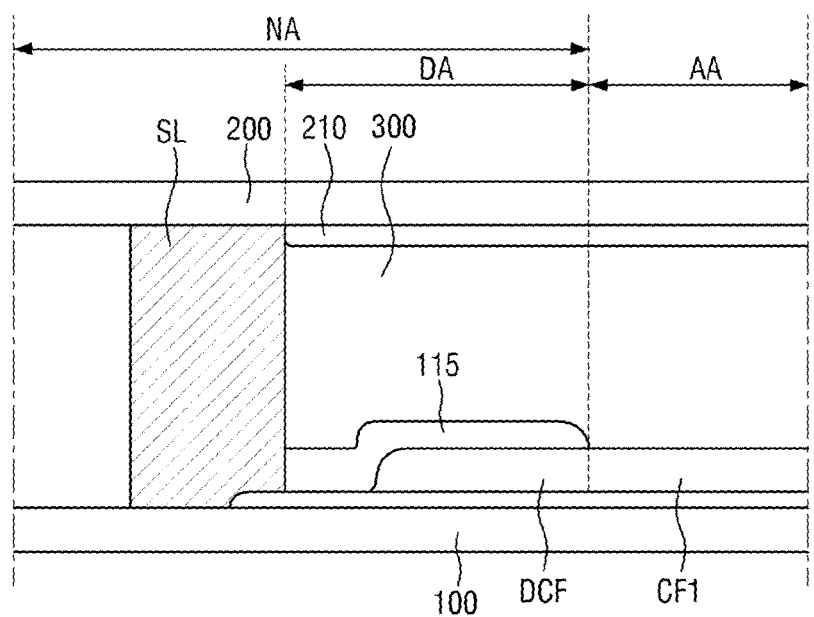
FIG. 14 is a cross-sectional view taken along the line C-C' in the display device array substrate of FIG. 13.
Figure 15:
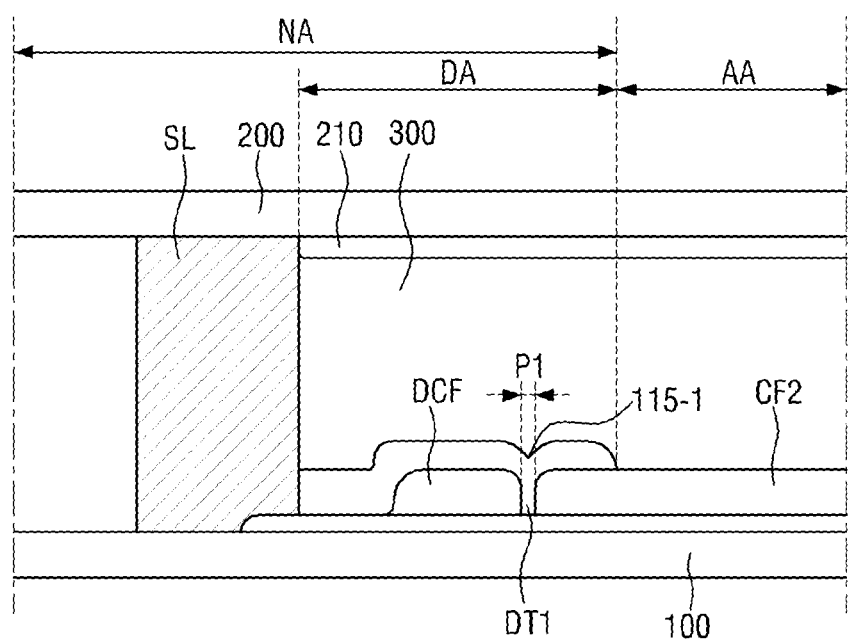
FIG. 15 is a cross-sectional view taken along the line D-D' in the display device array substrate of FIG. 13.

Meanwhile, FIG. 14 illustrates a cross-sectional view taken along the line C-C' in the display device array substrate of FIG. 13, and FIG. 15 illustrates a cross-sectional view taken along the line D-D' in display device array substrate of FIG. 13.

Referring to FIGS. 13 to 15, the second color filter CF2 is formed to extend from the display area AA to the dummy area DA, and may be disposed to be spaced apart (DT1) from the dummy color filter DCF by a constant interval P1. As explained above, the spaced interval P1 may be in the range of 0 μm to 5 μm.

The first color filter CF1 and the dummy color filter DCF may be formed of the same material, and for example, may be a blue or red color filter. In this case, as illustrated in FIG.

14, the dummy color filter DCF may be formed by the extension of the first color filter CF1.

In other words, the second color filter may be formed by being spaced apart from the dummy color filter DCF by a fixed distance in the dummy area DA, and meanwhile, the first color filter CF1 may be formed of the same material as the dummy color filter DCF. That is, one color filter may extend to form a dummy color filter. As explained above, the first color filter CF1 and the dummy color filter DCF may be a red or blue color filter, and the dummy color filters DCF of the dummy area DA may be simultaneously formed by a process of forming the first color filter.

As illustrated in FIG. 15, when the second color filter CF2 and the dummy color filter DCF are spaced apart from each other, the black matrix 115 may be formed over a part of the second color filter CF2 and on top of the dummy color filter DCF, and the thickness of the black matrix 115 at the boundary between the dummy color filter DCF and the second color filter CF2 may be equal to or smaller than the thickness of the black matrix 115 on the dummy color filter DCF. That is, a recessed portion 115-1 may be formed at the boundary between the dummy color filter DCF and the second color filter CF2.

Meanwhile, as illustrated in FIG. 13, since the color filters partially overlap one another in the display area AA, and the color filters do not overlap one another in the dummy area DA, it is possible to ensure a process margin. Since some of the color filters and the dummy filter are spaced apart from each other by a constant interval, it is possible to provide a more uniform step in the dummy area DA.

Figure 16:
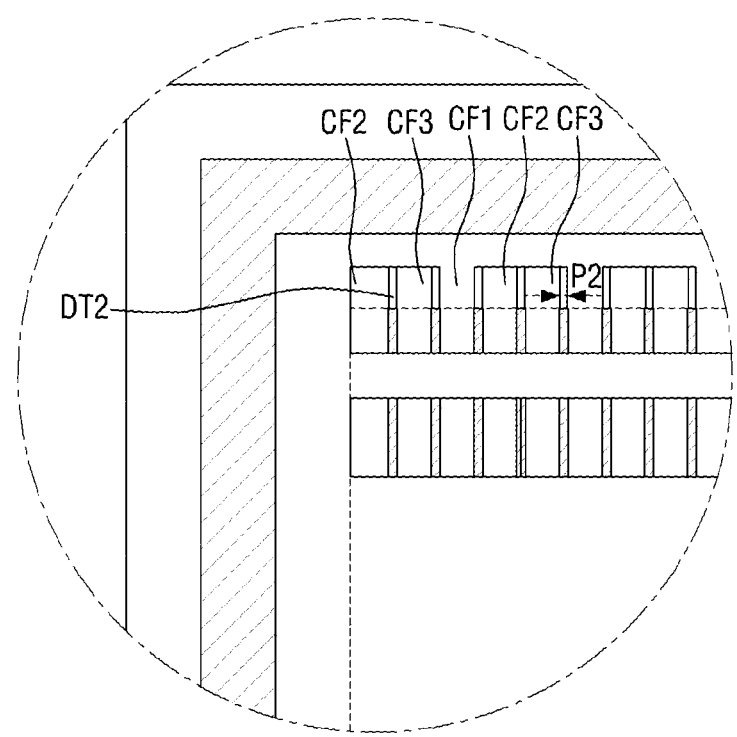
FIG. 16 is an enlarged plan view of a portion A of the display device array substrate according to another embodiment of the present invention.

FIG. 16 illustrates an enlarged plan view of a portion A of the display device array substrate according to another embodiment of the present invention.

Referring to FIG. 16, the display device array substrate may be formed so that the first color filter CF1 and the second color filter CF2 are spaced apart (DT2) from each other by a constant interval P2 in the dummy area DA. Meanwhile, since other configurations are the same as those described above, repeated description will not be provided.

Figure 17:
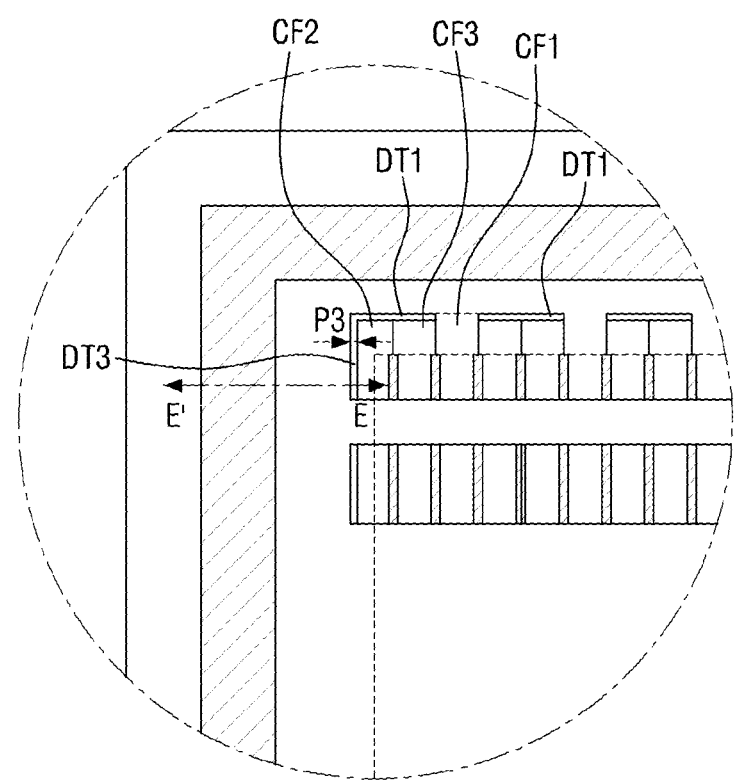
FIG. 17 is an enlarged plan view of the portion A of the display device array substrate according to another embodiment of the present invention.
Figure 18:
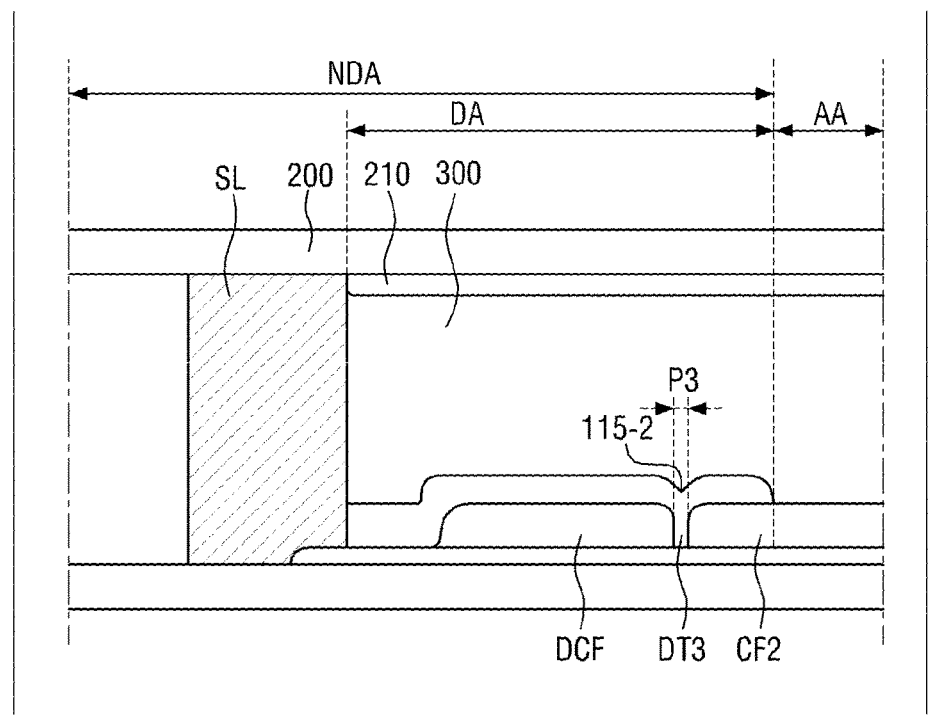
FIG. 18 is a cross-sectional view taken along the line E-E' in the display device array substrate of FIG. 17.

FIG. 17 illustrates an enlarged plan view of a portion A of the display device array substrate according to another embodiment of the present invention. FIG. 18 illustrates a cross-sectional view taken along the line E-E' in the display device array substrate of FIG. 17.

Referring to FIGS. 17 and 18, the upper side, the left side or the right side of the color filter located at the boundary between the display area AA and the dummy area DA in the display device array substrate may be disposed over the boundary between the display area AA and the dummy area DA. Moreover, the upper sides and the left sides of the color filters (CF2, CF3) may be spaced apart by a constant interval P3 from the dummy color filter DCF. The left spaced interval P3 may be in the range of 0 μm to 5 μm, as described above.

Meanwhile, the black matrix 115 may be disposed on the dummy color filter DCF, and the black matrix 115 may also be partially disposed on the upper portions of the color filters (CF1, CF2, CF3) on the display area AA. The black matrix 115 may be configured so that the recessed portion 115-2 is formed at a gap between the dummy color filter DCF and the color filter CF2, and thus, the thickness of the recessed portion may be smaller than the black matrix at other locations.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Various features of the above described and other embodiments can be mixed and matched in any manner, to produce further embodiments consistent with the invention.

What is claimed is:

1. A display device array substrate comprising:
   first and second substrates that comprise a display area and a dummy area around the periphery of the display area, and that face each other;
   a color filter disposed on the first substrate;
   a data line disposed between the first substrate and the color filter;
   a liquid crystal layer disposed on the color filter; and
   a dummy color filter disposed in the dummy area, the dummy color filter extending around the display area,
   wherein the color filter comprises a first color filter and a second color filter adjacent to the first color filter,
   wherein the first color filter and the second color filter overlap each other in the display area and do not overlap each other in the dummy area,
   wherein the first color filter and the second color filter overlap each other on the data line,
   wherein a height of the color filter from an upper surface of the data line in the display area is greater than a height of the color filter from the upper surface of the data line in the dummy area,
   wherein the second color filter is spaced apart from the dummy color filter in the dummy area,
   wherein a side surface of the second color filter and a side surface of the dummy color filter define a gap between the second color filter and the dummy color filter,
   wherein the display device further comprises a black matrix disposed on the dummy color filter and the second color filter,
   wherein the black matrix extends around a periphery of the display area in the dummy area, and
   wherein the black matrix directly contacts an upper surface of the dummy color filter, an upper surface of the second color filter, the side surface of the second color filter and the side surface of the dummy color filter.

2. The display device array substrate of claim 1, wherein the dummy color filter comprising a same material as one of the first color filter and the second-color filter.

3. The display device array substrate of claim 2, wherein the dummy color filter is a red or blue color filter.

4. The display device array substrate of claim 1, wherein the gap between the second color filter and the dummy color filter is more than 0 μm and equal to or less than 5 μm.

5. The display device array substrate of claim 1, wherein the thickness of the black matrix over the gap between the dummy color filter and the second color filter is smaller than the thickness of the black matrix on the dummy color filter.

6. The display device array substrate of claim 1, wherein the first color filter and the second color filter are spaced apart from each other in the dummy area.

7. The display device array substrate of claim 2, wherein the color filter further comprises a third color filter, and the third color filter is a green color filter.

* * * * *